(12) United States Patent
Margulis

(10) Patent No.: US 8,458,595 B1
(45) Date of Patent: Jun. 4, 2013

(54) VIDEO EDITING INCLUDING SIMULTANEOUSLY DISPLAYING TIMELINES AND STORYBOARDS

(75) Inventor: Vlad Margulis, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 12 days.

(21) Appl. No.: 13/090,968

(22) Filed: Apr. 20, 2011

Related U.S. Application Data

(62) Division of application No. 11/445,040, filed on May 31, 2006, now abandoned.

(51) Int. Cl.
*G06F 3/00* (2006.01)
*G06F 3/048* (2006.01)

(52) U.S. Cl.
USPC ............ 715/723; 715/720; 715/804; 715/838

(58) Field of Classification Search
None
See application file for complete search history.

(56) References Cited

U.S. PATENT DOCUMENTS

| | | | |
|---|---|---|---|
| 5,404,316 A | | 4/1995 | Klingler et al. |
| 5,442,744 A | * | 8/1995 | Piech et al. ................... 715/251 |
| 5,544,318 A | | 8/1996 | Schmitz et al. |
| 5,664,216 A | * | 9/1997 | Blumenau .................... 715/234 |
| 5,732,184 A | * | 3/1998 | Chao et al. ................... 386/282 |
| 5,760,767 A | | 6/1998 | Shore et al. |
| 5,786,814 A | * | 7/1998 | Moran et al. ................. 715/720 |
| 5,999,173 A | | 12/1999 | Ubillos |
| 6,154,600 A | | 11/2000 | Newman et al. |
| 6,204,840 B1 | | 3/2001 | Petelycky et al. |
| 6,400,378 B1 | | 6/2002 | Snook |
| 6,570,587 B1 | * | 5/2003 | Efrat et al. ................... 715/723 |
| 6,628,889 B2 | * | 9/2003 | Inoue ........................... 386/241 |
| 6,807,361 B1 | | 10/2004 | Girgensohn et al. |
| 6,928,613 B1 | | 8/2005 | Ishii et al. |
| 7,334,190 B2 | | 2/2008 | Wierowski |
| 7,352,952 B2 | | 4/2008 | Herberger et al. |
| 7,614,012 B1 | * | 11/2009 | Dulaney ....................... 715/838 |
| 7,882,258 B1 | * | 2/2011 | Sumler et al. ................ 709/231 |
| 2001/0038742 A1 | * | 11/2001 | Takano ........................ 386/52 |
| 2001/0040592 A1 | | 11/2001 | Foreman et al. |
| 2002/0106187 A1 | | 8/2002 | Inoue |
| 2003/0002851 A1 | | 1/2003 | Hsiao et al. |
| 2003/0142955 A1 | | 7/2003 | Hashizume et al. |
| 2003/0215214 A1 | | 11/2003 | Ma |
| 2004/0001079 A1 | | 1/2004 | Zhao et al. |
| 2004/0033632 A1 | | 2/2004 | Chen et al. |
| 2004/0090462 A1 | | 5/2004 | Graham |
| 2004/0113934 A1 | * | 6/2004 | Kleinman et al. ............ 345/732 |
| 2004/0131340 A1 | | 7/2004 | Antoun et al. |
| 2004/0170382 A1 | | 9/2004 | Portnykh |
| 2004/0263636 A1 | | 12/2004 | Cutler et al. |
| 2005/0071886 A1 | | 3/2005 | Deshpande |

(Continued)

OTHER PUBLICATIONS

RealPlayer 7 Plus Manual, Chapter 7, Jan. 27, 2005, pp. 59-77.

(Continued)

*Primary Examiner* — Stephen Alvesteffer
(74) *Attorney, Agent, or Firm* — Wolfe-SBMC

(57) ABSTRACT

Video editing including simultaneously displaying timelines and storyboards is described, including displaying a timeline of a video presentation, displaying a storyboard of the video presentation including scenes of the video presentation simultaneously to the displaying the timeline, and navigating the timeline in response to receiving an input to select a individual scene of the video presentation.

20 Claims, 6 Drawing Sheets

U.S. PATENT DOCUMENTS

| | | | |
|---|---|---|---|
| 2005/0084232 | A1 | 4/2005 | Herberger et al. |
| 2005/0257152 | A1 | 11/2005 | Shimizu et al. |
| 2006/0008247 | A1* | 1/2006 | Minami et al. .................. 386/52 |
| 2006/0059426 | A1 | 3/2006 | Ogikubo |
| 2006/0159414 | A1 | 7/2006 | Wolf et al. |
| 2006/0224940 | A1 | 10/2006 | Lee |
| 2006/0277454 | A1 | 12/2006 | Chen |
| 2006/0284978 | A1 | 12/2006 | Girgensohn et al. |
| 2007/0033632 | A1 | 2/2007 | Baynger et al. |
| 2007/0089152 | A1* | 4/2007 | Patten et al. .................. 725/134 |
| 2007/0171224 | A1* | 7/2007 | MacPherson .................. 345/440 |
| 2008/0077866 | A1 | 3/2008 | Margulis |
| 2009/0158206 | A1 | 6/2009 | Myllyla |

OTHER PUBLICATIONS

Studio Plus Version 10, User Guide, 4 Figs., 3 pages, release date Sep. 15, 2005.

Adobe Premiere 6.0, Review Date: Apr. 30, 2001, Erik Holsinger.

U.S. Appl. No. 11/449,215, filed Jun. 7, 2006.

iLife '06, "iMovie HD6," Copyright 2006 Apple Computer, Inc., 4 pages.

Final Cut Studio Cut to the Future, "Motion 2. Advanced Animation. Instant Gratification.", http://www.apple.com/finalcutstudio/motion/, copyright 2005 Apple Computer, Inc., 4 pages.

* cited by examiner

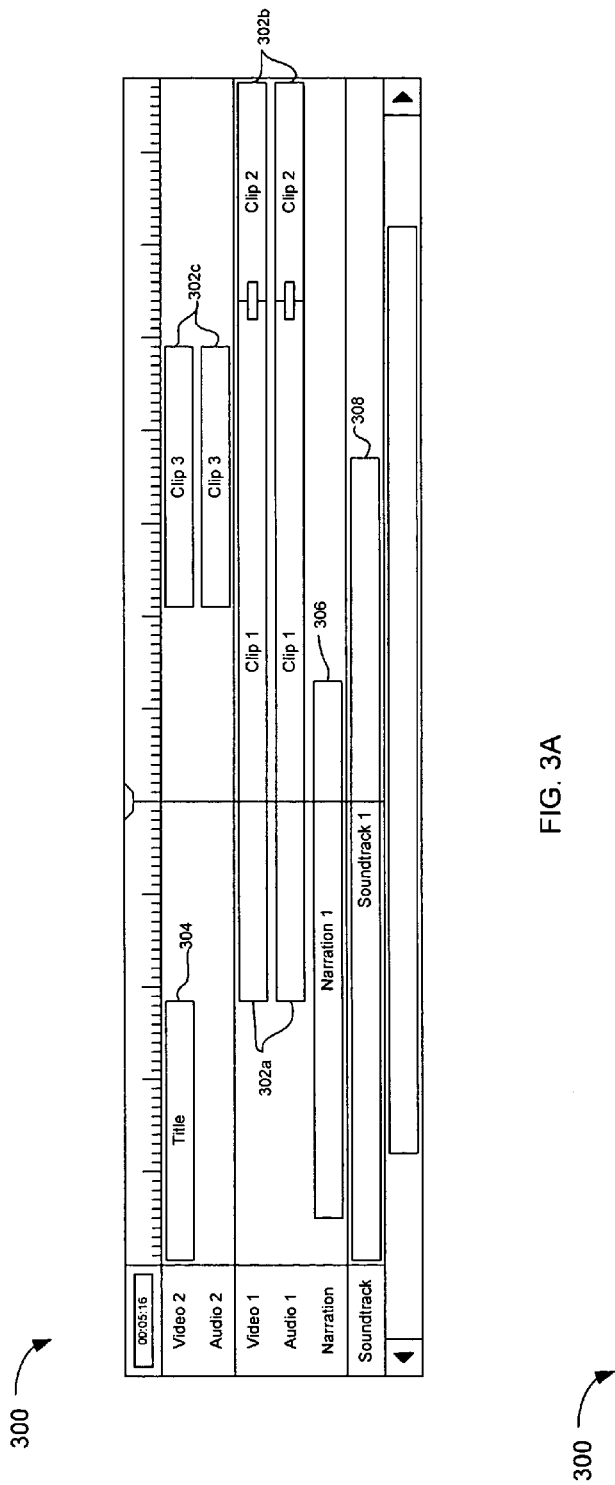
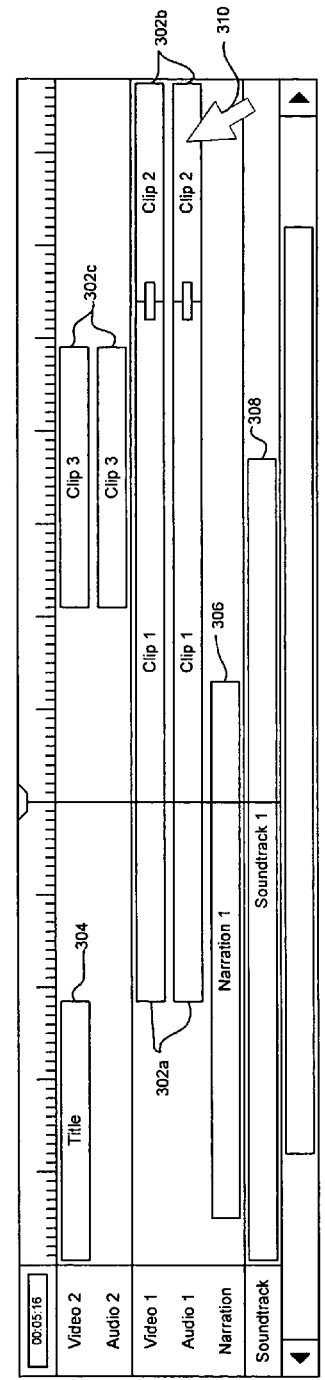
FIG. 3A
FIG. 3B

VIDEO EDITING INCLUDING SIMULTANEOUSLY DISPLAYING TIMELINES AND STORYBOARDS

This application is a divisional of U.S. application Ser. No. 11/445,040, filed May 31, 2006 now abandoned, which is incorporated herein by reference in its entirety.

FIELD OF THE INVENTION

The present invention relates generally to software. More specifically, video editing including simultaneously displaying timelines and storyboards is described.

BACKGROUND OF THE INVENTION

Video editing is the process of assembling a collection of various media, such as video, audio, and still images, into a finished video suitable for viewing. Video editing can be performed using several techniques, one of which is to create digital videos using video editing software on a processing system such as a personal computer.

Video editing software typically includes a graphical interface used to arrange media into a video presentation. The video presentation may then be compiled into a finished video. A user may also use the graphical interface to modify the video presentation by altering the media (e.g., changing the speed of a video clip), or by adding enhancements such as titles, transitions, and narration. The interface may include a timeline, which may have multiple tracks in which media (such as video clips) and enhancements (such as transitions) may be arranged.

The time line typically includes hash marks with adjacent time signatures to indicate the time at which the media or modifications will appear. Adjacent to the hash marks are various tracks, which may be created by a user. For example, video presentation may include four tracks: two video tracks and two audio tracks. The user may arrange video and audio clips within these tracks, determining where to place the media clips by referencing the hash marks.

A video may include several individual clips or other elements. For a video of significant length, it may be difficult to view an entire video presentation on a single screen. In these cases, a user zooms into a specific portion of the timeline to view the portion the user wishes to edit. However, editing may be difficult when viewing only a small portion of a video presentation, and it may be cumbersome to repeatedly zoom in and out of or scroll through a timeline.

Thus, what is needed is a timeline without the limitations of conventional techniques.

BRIEF DESCRIPTION OF THE DRAWINGS

Various embodiments of the invention are disclosed in the following detailed description and the accompanying drawings:

FIGS. 3A-3C illustrate altering a view of a timeline in response to an input according to an embodiment;

DETAILED DESCRIPTION

Various embodiments of the invention may be implemented in numerous ways, including as a system, a process, an apparatus, or a series of program instructions on a computer readable medium such as a computer readable storage medium or a computer network where the program instructions are sent over optical or electronic communication links. In general, operations of disclosed processes may be performed in an arbitrary order, unless otherwise provided in the claims.

A detailed description of one or more embodiments is provided below along with accompanying figures. The detailed description is provided in connection with such embodiments, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the embodiments has not been described in detail to avoid unnecessarily obscuring the description.

According to various embodiments, video editing is described. Video editing may be performed using, for example, video editing software that compiles various media into a finished video. A timeline of a video presentation may be displayed.

Simultaneously, a storyboard of the video presentation including scenes of the video presentation may also be displayed. A user can then navigate about the timeline by selecting a scene of the storyboard. Simultaneously displaying the storyboard and the timeline allows a user to see the entire video presentation, and to easily navigate through the media in the video presentation and shown on the timeline.

Video Editing Software Displaying a Timeline and a Storyboard Simultaneously

Figure 1:
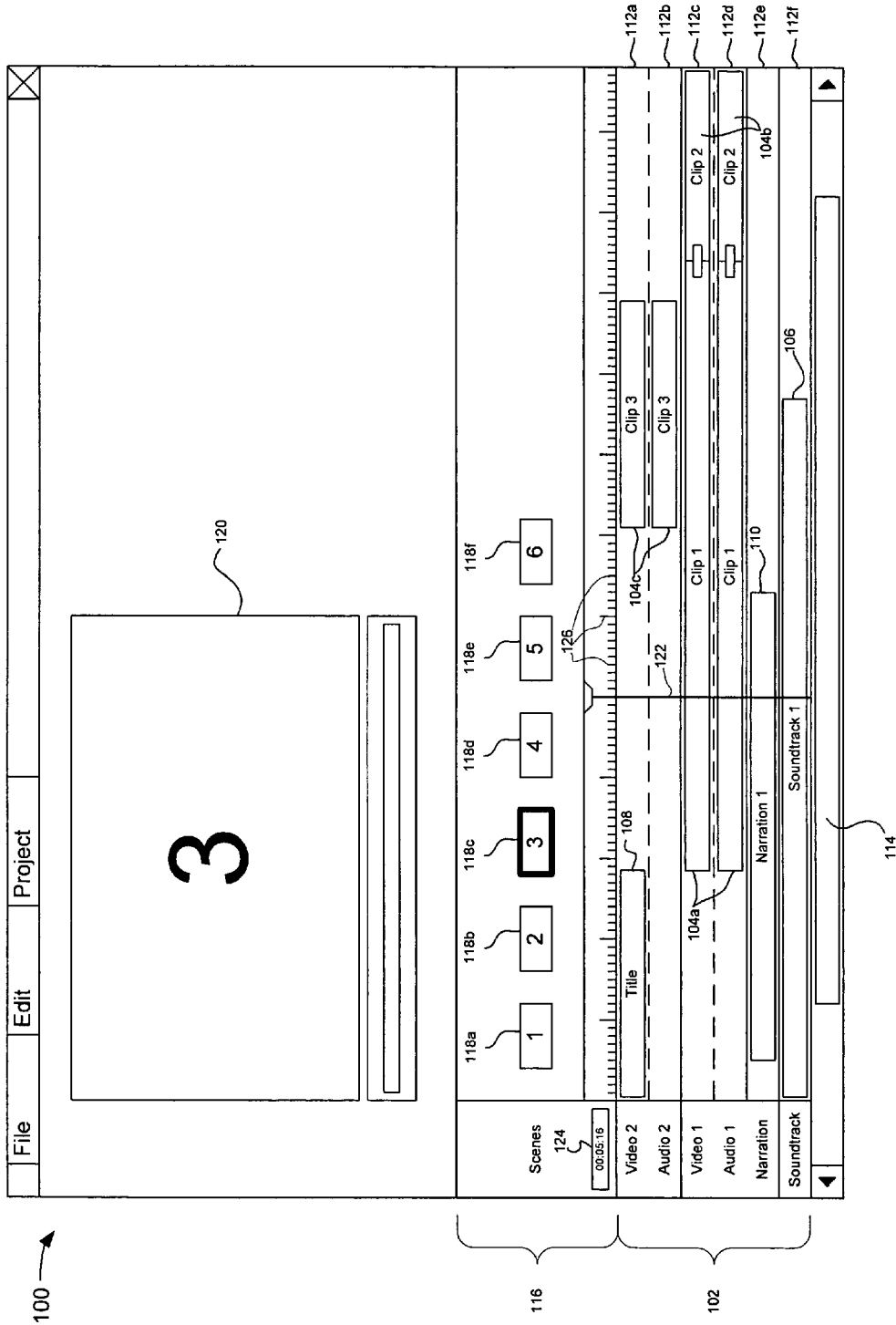
FIG. 1 illustrates video editing software in accordance with an embodiment.

FIG. 1 illustrates video editing software in accordance with an embodiment. Video editing software 100 may be used to assemble a variety of media, such as video, audio, and still images, into a video presentation which may then be compiled into a finished video to be viewed by a user. The video editing software 100 may include a storyboard and a timeline which are displayed simultaneously. The storyboard may further be used to navigate through the timeline.

A video presentation, according to an embodiment, is a collection of elements, including media clips such as video and audio clips, and enhancements, such as titles and transitions, in an arrangement that may be compiled into a finished video which can then be viewed by a user. The video presentation may be assembled using the video editing software 100, and may be saved by a user to a storage device to be recalled at a later time. The video presentation may further include media and enhancements other than those of the type shown here.

The video editing software 100 includes a timeline 102 that displays various media and enhancements that have been assembled into a video presentation. The media may include several video clips 104a-104c and a soundtrack 106, and the enhancements may include a title animation 108 a narration track 110. The video clips 104a-104c may include both a video and an audio component. The timeline 102 may include several tracks 112a-112f into which the media are arranged. For example, the tracks 112a and 112c may be video tracks, the tracks 112b and 112d may be audio tracks, the track 112e may be a narration track, and the track 112f may be a soundtrack. Other enhancements not shown here, such as transitions, and other types of media, such as still images, may also be added to the video presentation shown in the timeline 102.

A video presentation may be assembled using the timeline 102. The video presentation may be quite lengthy, and therefore, the timeline 102 may be larger than what can legibly be shown on a single screen. The timeline 102 may therefore be navigated using a scroll bar 114. Additionally, the timeline 102 may also be navigated using a storyboard 116, as discussed below.

A storyboard 116 comprises several scenes 118a-118f of the video presentation and is displayed simultaneously to the timeline 102. The timeline 102 may be large and difficult to display on a single screen. By displaying the storyboard 116 simultaneously, a user can navigate about the timeline 102 by manipulating the storyboard 116 (e.g., selecting various the scenes 118a-118f). Additionally, a user may more easily rearrange the video presentation using the scenes of the storyboard.

A scene may be a portion of the video presentation. Scenes are constructs that may be determined as appropriately suited for a specific application. For example, a scene may be a distinct portion of the video presentation that is designated by a user or the video editing software 100. Additionally, as another example, the scenes may be chosen from the video from a main track (e.g., the track 112c) of a video presentation. The main track may be a video track in which various scene breaks are placed. For example, a break may occur between scenes where the video fades to black, or where a new chapter begins. The entirety of the video presentation may be divided into several scenes 118a-118f, which aid in navigation and arrangement of the video presentation.

For example, when a user selects the scene 118c (which, as shown here, is highlighted to indicate that it has been selected), the view of the timeline 102 advances to a point where the scene 118c begins. The beginning of the scene 118c is displayed in a display window 120, and an indicator 122 marks the position along the timeline 102 where the scene 118c begins. A timer 124 generally indicates the position of the indicator 122 and, as shown here, notes the time of the beginning of the scene 118c. Hash marks 126 can be used to determine at what time in the video presentation a media clip or enhancement begins and how long the media clip or enhancement lasts.

The position of the scenes 118a-118f within the timeline 102 may be arbitrarily determined, and may or may not correspond to the starting positions of the clips 104a-104f. For example, a scene may begin every minute, when a new clip begins in a main track, or the positioning of the scenes may be designated by a user.

A user may use the storyboard 116 to easily rearrange or reorganize the video presentation shown in the timeline 102. For example, the user may select the scene 118c using a pointing device and drag the scene 118c to another location within the storyboard 116 to change the position of the scene 118c within the video presentation. The user may further delete the scene or modify the scene (e.g., change the playback speed of the scene, brighten or darken the scene).

According to an embodiment, a scene may be designated as the content of one or more tracks between a beginning time and an end time. Further, according to another embodiment, a scene may have additional media associated with it. For example, the scene 118c may include the video clips 104a and 104b. The narration track 110 (or a portion of the narration track 110 corresponding to the length of the scene 118c) may be associated with the scene 118c. A user may choose to lock the narration track 110 (or portion thereof) to the scene 118c. When the scene 118c is moved, the associated media would then move with it. If the narration track 110 were not locked, the narration track 110 would remain where it was when the scene was moved. Any type of associated media may be established with a scene. As mentioned above, a scene is an abstract construct, which may be defined by a particular program or by a user.

Although a specific timeline 102 and storyboard 116 are shown here, it is understood that various other graphical interfaces may also be used with the video editing software 100.

Figure 2:
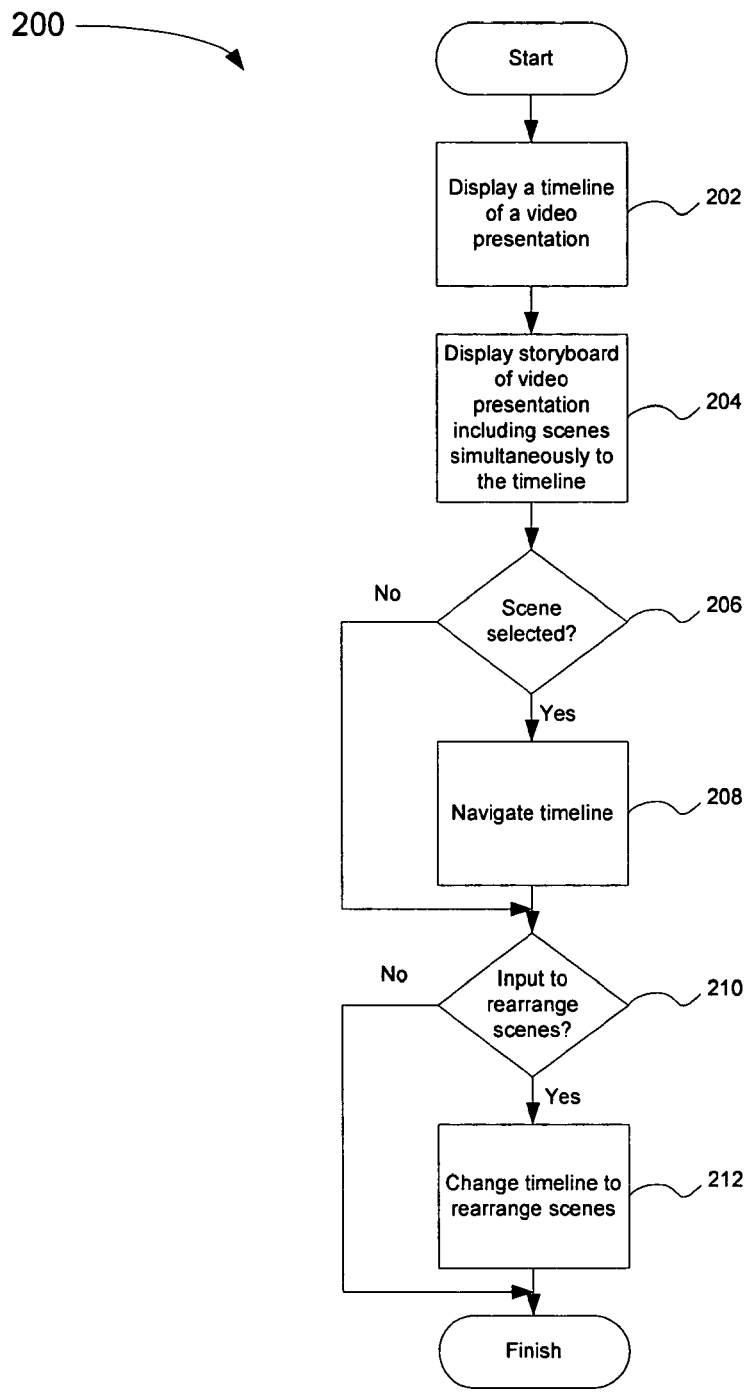
FIG. 2 is a flowchart describing a process for simultaneously displaying a storyboard and a timeline and navigating the timeline using the storyboard according to an embodiment.

FIG. 2 is a flowchart describing a process for simultaneously displaying a storyboard and a timeline and navigating the timeline using the storyboard according to an embodiment. The process 200 generally describes using video editing software, such as the video editing software 100, to create a video presentation using a simultaneously displayed storyboard and timeline, and responding to user inputs to rearrange the video presentation using the storyboard or timeline.

In block 202, a timeline of a video presentation is displayed. The timeline may be, for example, the timeline 102, shown above. The timeline may include various media including video clips, audio clips, still images, and the like. The timeline can be used to organize media into a video presentation. In some embodiments, it may be difficult to display a timeline for an entire video presentation legibly on a single screen, so only a portion of the timeline may be displayed.

In block 204, a storyboard of the video presentation including scenes of the video presentation is displayed simultaneously to the timeline. The storyboard may, according to an embodiment, be displayed adjacent to the timeline. The storyboard may include several scenes of the video presentation, such as the scenes 118a-118f. The scenes may be selected using a selection process that may be arbitrary or predetermined. For example, the scenes may be selected at a predetermined interval (e.g., every minute), may be a portion of the total timeline (e.g., one scene for every one-tenth of the total timeline), or the scenes may correspond to individual media clips in the timeline.

As mentioned above, the scenes may further be associated with associated media. Although a scene may be derived from a main track (e.g., the main video track), other tracks, such as a narration track or a soundtrack, may also be associated with the scene. A user may decide, for example using a menu selection, to lock or unlock the associated media to or from the scene. The operation of locking and unlocking media is explained below.

In block 206, it is determined whether a user input to select an individual scene of the video presentation has been received. The user input may be, for example, selecting an individual scene (e.g., the scene 118c) using a pointing device such as a mouse. If the user has selected an individual scene, in block 208, the timeline is navigated in response. For example, a user may select a specific scene. When the individual scene is selected, the view of the timeline changes to show the individual scene. The navigating may further include zooming into a portion of the timeline corresponding to the individual scene.

In block 210, it is determined whether a user input to rearrange an individual scene has been received. The user input may be, for example, selecting an individual scene using a pointing device, and dragging the individual scene to a new position within the storyboard. If a user input to rearrange an individual scene has been received, in block 212, the timeline is changed to rearrange the scenes of the video presentation. Rearranging an individual scene may include moving media represented in the individual scene (for example, the main track of the video presentation). If there is additional media associated with the individual scene (e.g., a soundtrack or narration track), the associated media may also be rearranged along with the main track.

According to an embodiment, a user may choose to "lock" the associated media to the individual scene. If the user has chosen to lock the associated media, when a user rearranges an individual scene, the associated media travels along with the individual scene. Alternatively, if the associated media is not locked to the individual scene, the associated media remains in its original position on the timeline. A user may also lock only certain tracks and not others. For example, a user may decide to lock every associated track except a soundtrack to a scene.

Altering Timeline Display in Response to an Input

Figure 3C:
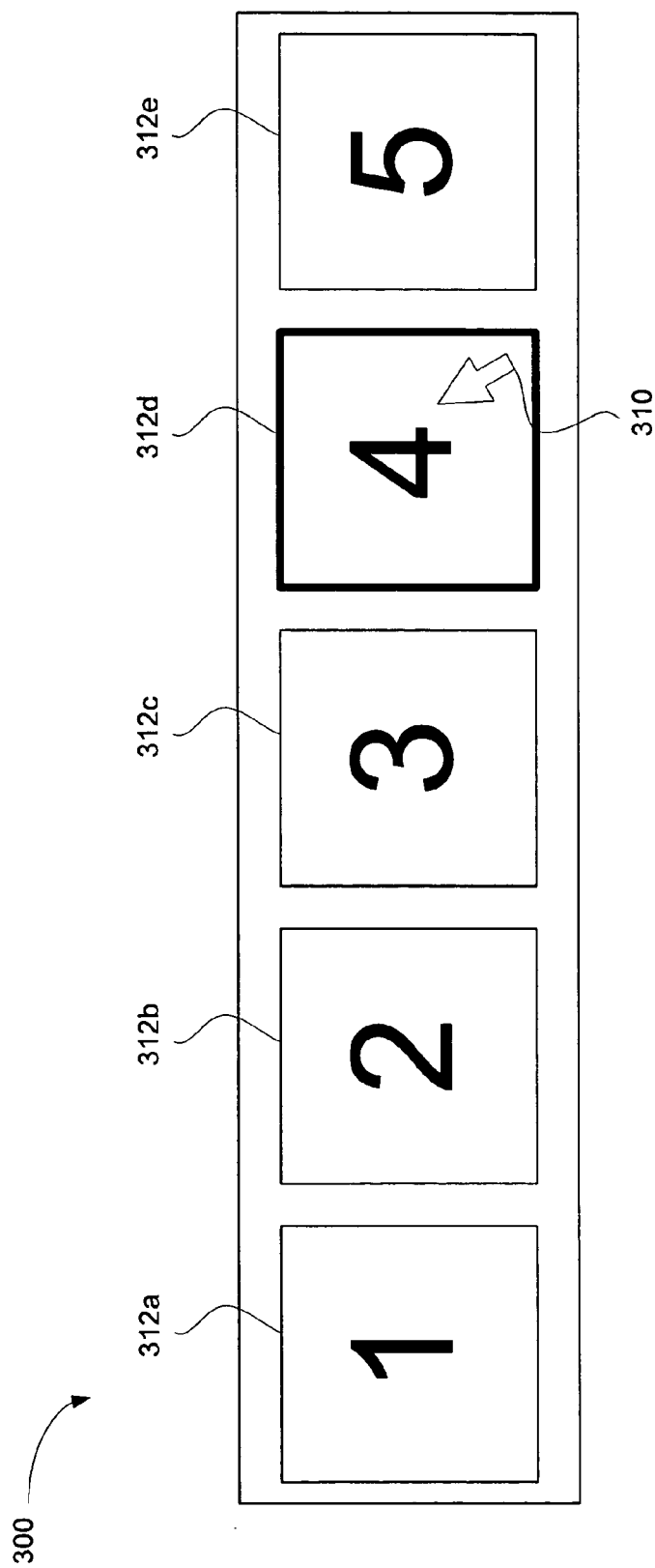

FIGS. 3A-3C illustrate altering a view of a timeline in response to an input according to an embodiment. A user may manipulate a timeline to, for example, select a clip and rearrange the clip within the timeline. According to an embodiment, when the clip is selected, the timeline view changes to a storyboard view to facilitate video editing.

FIG. 3A illustrates a timeline 300 including several media clips, according to an embodiment. A video presentation may include media clips 302a-302c and enhancements such as a title animation 304, a narration track 306, and a soundtrack 308. The media clips 302a-302c may be freely rearranged and repositioned within the timeline 300 according to a user's wishes. The display of the timeline 300 includes a visual representation of a video presentation, including visual representations of the media clips 302a-302c, the title animation 304, narration track 306, and soundtrack 308. According to an embodiment, when a user makes such a modification, the view of the timeline changes to a storyboard view.

FIG. 3B illustrates the timeline 300 including a user selecting a media clip to rearrange the video presentation. A pointer 310 may be controlled by a pointing device, such as a mouse. When a user wants to make a change to the video presentation (e.g., by moving the media clip 302b), the user may select a clip, and drag the clip to a new location. However, when viewing the timeline 300, it may not be possible to view a sufficient amount of the video presentation to adequately edit the presentation. Therefore, according to an embodiment, when an input to manipulate the video presentation (e.g., selecting a media clip) is made, the timeline view changes to a storyboard view as shown in FIG. 3C.

FIG. 3C illustrates the timeline 300 after it has been switched to a storyboard view. The display of the timeline 300 has been altered and now shows several scenes 312a-312e which can be manipulated (e.g., rearranged) using the storyboard view. The pointer 310, which had previously selected the media clip 302b, is now shown selecting the scene 312d. According to an embodiment, once the user has positioned the scene in the desired location, the user can release (i.e., deselect) the scene 312d and the timeline 300 may return to the previous timeline view, as shown in FIGS. 3A and 3B.

Alternatively, the storyboard view of the timeline 300 may also be displayed simultaneously to the timeline 300, as is shown in FIG. 1. According to this embodiment, the timeline 300 may be displayed, and when an input to manipulate the video presentation is received, the storyboard view is then displayed adjacent to the timeline view.

Figure 4:
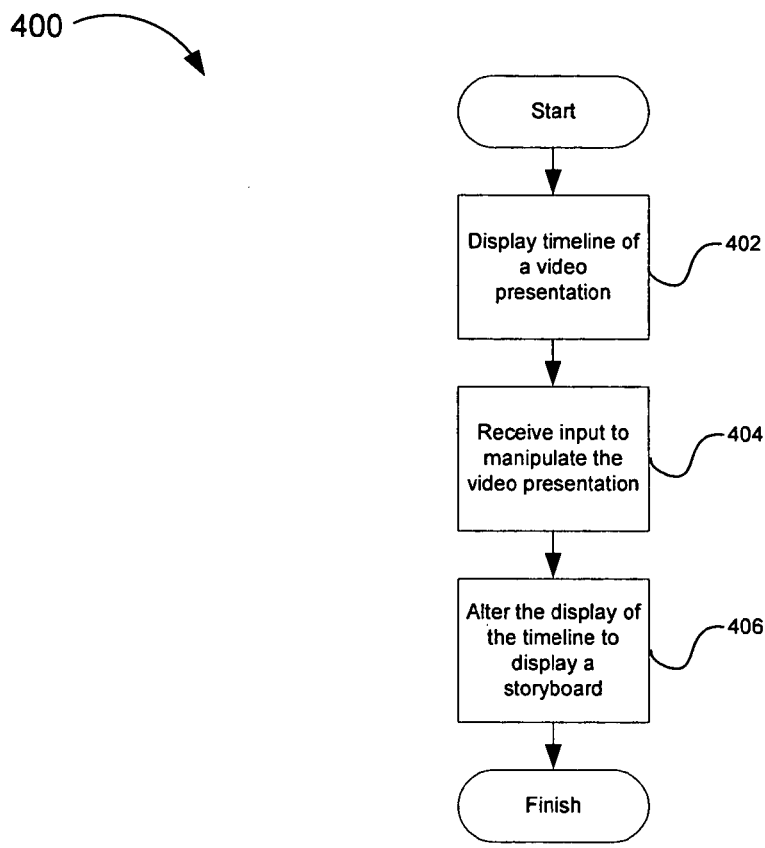
FIG. 4 is flowchart describing a process for switching to storyboard view upon detecting an input to manipulate a video presentation according to an embodiment.

FIG. 4 is flowchart describing a process for switching to storyboard view upon detecting an input to manipulate a video presentation according to an embodiment. The process 400 generally describes receiving an input to select an element of a timeline, and altering the view of the timeline in response to the input.

In block 402, a timeline of a video presentation including a visual representation of a video sequence is displayed. The timeline may be, for example, the timeline 300 as shown above in FIGS. 3A and 3B. The timeline may include several media clips and other elements. The visual representation of the video sequence includes the display showing the various media clips and enhancements, such as is shown in FIG. 3A.

In block 404, an input to manipulate the video presentation is received. The input may be, for example, a pointer selecting an element of the video presentation such as a media clip within the timeline. According to other embodiments, the manipulation is not detected until an action in addition to selecting a media clip occurs. For example, the input may be an input to drag or move a selected media clip. Generally, the input to manipulate the video presentation may be any input, such as selecting, moving, or changing an element of the video presentation as displayed in the timeline.

In block 406, the displaying of the timeline is altered by displaying a storyboard including an image of a portion of the video presentation. The storyboard view may be as shown above in FIG. 3C. The image may be a representative image of a scene, for example. The displaying of the storyboard may, according to an embodiment, be instead of the displaying of the timeline. According to other embodiments, the displaying of the storyboard may only partially replace the displaying of the timeline, or may be displayed adjacent to (i.e., in addition to) the timeline.

An Exemplary Computer System

Figure 5:
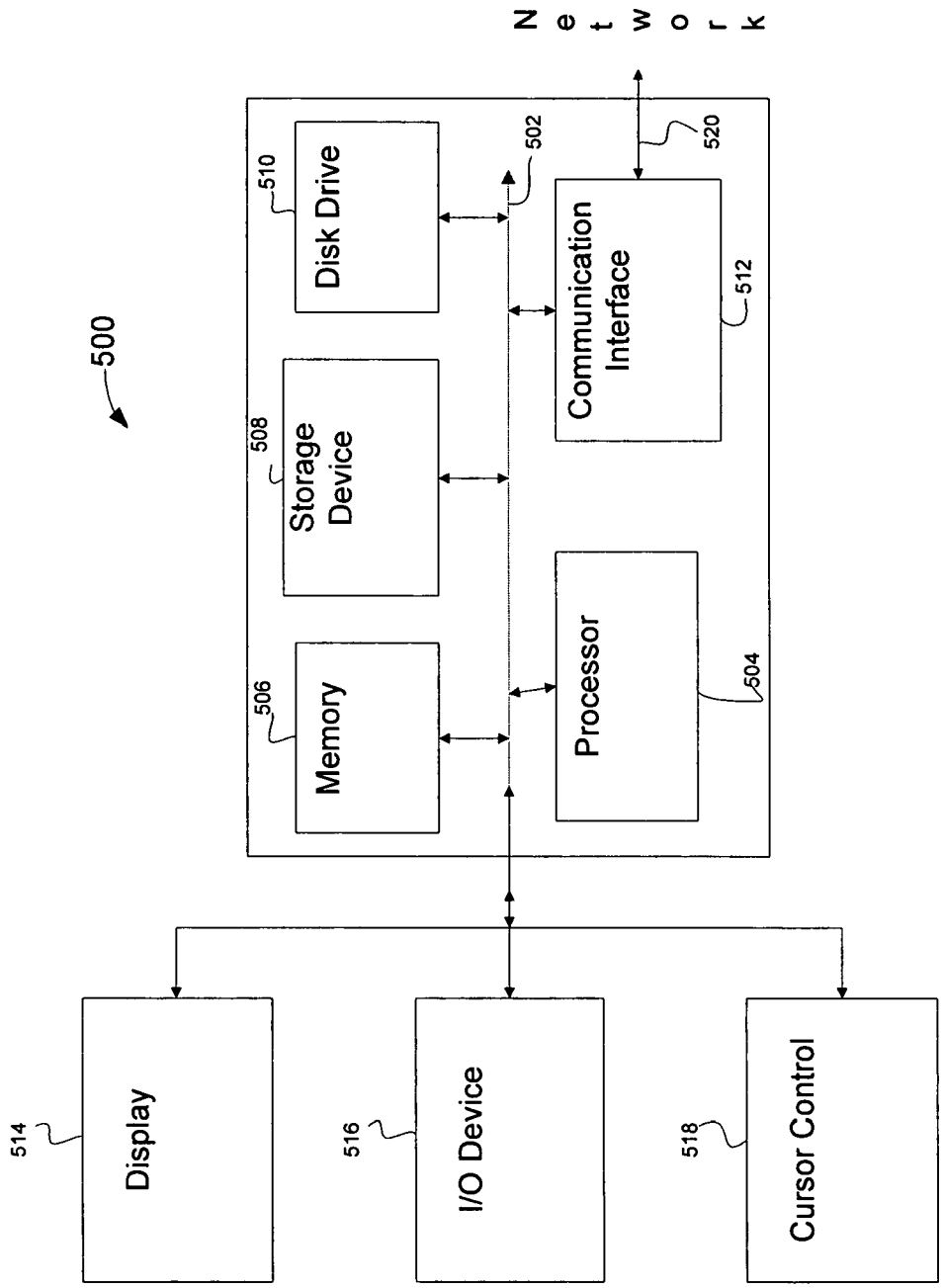
FIG. 5 is a block diagram illustrating an exemplary computer system suitable for video editing including simultaneously displaying timelines and storyboards, in accordance with various embodiments.

FIG. 5 is a block diagram illustrating an exemplary computer system suitable for video editing including simultaneously displaying timelines and storyboards, in accordance with various embodiments of the invention. In some embodiments, a computer system 500 may be used to implement computer programs, applications, methods, processes, or other software to perform the above-described techniques. The computer system 500 includes a bus 502 or other communication mechanism for communicating information, which interconnects subsystems and devices, such as a processor 504, a system memory 506 (e.g., RAM), a storage device 508 (e.g., ROM), a disk drive 510 (e.g., magnetic or optical), a communication interface 512 (e.g., modem or Ethernet card), a display 514 (e.g., CRT or LCD), an input device 516 (e.g., keyboard), and a cursor control 518 (e.g., mouse or trackball).

According to some embodiments of the invention, the computer system 500 performs specific operations by processor 504 executing one or more sequences of one or more instructions stored in the system memory 506. Such instructions may be read into the system memory 506 from another computer readable medium, such as the storage device 508 or the disk drive 510. In some embodiments, hard-wired circuitry may be used in place of or in combination with software instructions to implement the invention.

Although the foregoing examples have been described in some detail for purposes of clarity of understanding, the invention is not limited to the details provided. There are many alternative ways of implementing the invention. The disclosed examples are illustrative and not restrictive.

What is claimed:

1. A computer-implemented method comprising:
displaying several clips of a video presentation arranged within one or more tracks of a timeline of the video presentation;
detecting input to the timeline to reorganize the video presentation;
in response to said detecting, displaying a storyboard comprising multiple scenes of the video presentation, each scene configured for manual repositioning within the displayed storyboard, and each scene derived from one or more of the several clips;
manually repositioning, within the storyboard, one or more of the multiple scenes;
in response to said manually repositioning:
changing positions of the repositioned one or more of the multiple scenes within the video presentation;
rearranging, within the one or more tracks of the timeline, one or more of the several clips from which the repositioned one or more of the multiple scenes are derived, wherein said rearranging is based on said manually repositioning; and
redisplaying the timeline to reflect said rearranging; and
responsive to detecting input to select one of the multiple scenes within the storyboard:
changing a view of the timeline to show the selected scene; and
zooming into a portion of the timeline corresponding to the selected scene.

2. The method of claim 1, wherein said displaying the storyboard displays the storyboard adjacent to the timeline.

3. The method of claim 1, wherein during said displaying the storyboard, the timeline is not displayed.

4. The method of claim 1, wherein said detecting input to the timeline to reorganize the video presentation comprises detecting input to select an element of the video presentation.

5. The method of claim 1, wherein said detecting input to the timeline to reorganize the video presentation comprises detecting input to move an element of the video presentation.

6. The method of claim 1, further comprising, upon performing said manually repositioning the one or more of the multiple scenes within the storyboard, ceasing said displaying the storyboard.

7. The method of claim 1, wherein said displaying the storyboard partially replaces the timeline.

8. The method of claim 1, further comprising:
detecting a deselection of a scene of the multiple scenes in the storyboard; and
in response to said deselection, returning to a timeline view of the timeline that comprises displaying the timeline of the video presentation without displaying the storyboard for the video presentation.

9. A system comprising:
a memory storing program instructions to implement a video editing application; and
a processor configured to execute the program instructions to perform:
displaying several clips of a video presentation arranged within one or more tracks of a timeline of the video presentation;
detecting input to the timeline to reorganize the video presentation;
in response to said detecting, displaying a storyboard comprising multiple scenes of the video presentation, each scene configured for manual repositioning within the displayed storyboard, and each scene derived from one or more of the several clips;
manually repositioning, within the storyboard, one or more of the multiple scenes;
in response to said manually repositioning:
changing positions of the repositioned one or more of the multiple scenes within the video presentation;
rearranging, within the one or more tracks of the timeline, one or more of the several clips from which the repositioned one or more of the multiple scenes are derived, wherein said rearranging is based on said manually repositioning; and
redisplaying the timeline to reflect said rearranging; and
responsive to detecting input to select one of the multiple scenes within the storyboard
changing a view of the timeline to show the selected scene; and
zooming into a portion of the timeline corresponding to the selected scene.

10. The system of claim 9, wherein the program instructions are further executable to:
upon performing said manually repositioning the one or more of the multiple scenes within the storyboard, ceasing said displaying the storyboard.

11. The system of claim 9, wherein, during said redisplaying the timeline to reflect said rearranging, the timeline is displayed without displaying the storyboard comprising multiple scenes of the video presentation.

12. The system of claim 9, wherein said displaying the storyboard displays the storyboard adjacent to the timeline.

13. The system of claim 9, wherein during said displaying the storyboard, the timeline is not displayed.

14. The system of claim 9, wherein the input to the timeline to reorganize the video presentation comprises input to select a clip from among the several clips.

15. One or more computer-readable storage devices storing computer program instructions that when executed by a computer cause the computer to perform:
displaying several clips of a video presentation arranged within one or more tracks of a timeline of the video presentation;
detecting input to the timeline to reorganize the video presentation;
in response to said detecting, displaying a storyboard comprising multiple scenes of the video presentation, each scene configured for manual repositioning within the displayed storyboard, and each scene derived from one or more of the several clips;
manually repositioning, within the storyboard, one or more of the multiple scenes;
in response to said manually repositioning:
changing positions of the repositioned one or more of the multiple scenes within the video presentation;
rearranging, within the one or more tracks of the timeline, one or more of the several clips from which the repositioned one or more of the multiple scenes are derived, wherein said rearranging is based on said manually repositioning; and
redisplaying the timeline to reflect said rearranging; and
responsive to detecting input to select one of the multiple scenes within the storyboard:
changing a view of the timeline to show the selected scene; and
zooming into a portion of the timeline corresponding to the selected scene.

16. The one or more computer-readable storage devices of claim 15, wherein said displaying the storyboard partially replaces the timeline.

17. The one or more computer-readable storage devices of claim 15, wherein during said displaying the storyboard, the timeline is not displayed.

18. The one or more computer-readable storage devices of claim 15, wherein the input to the timeline to reorganize the video presentation comprises input to select a clip from among the several clips.

19. The one or more computer-readable storage devices of claim 15, wherein the computer instructions further cause the computer to detect deselecting a scene of the multiple scenes in the storyboard, and in response to said deselecting, returning to a timeline view of the timeline that comprises displaying the timeline of the video presentation without displaying a storyboard for the video presentation.

20. The one or more computer-readable storage devices of claim 15, wherein the computer instructions further cause the computer system to perform:

upon performing said manually repositioning the one or more of the multiple scenes within the storyboard, ceasing said displaying the storyboard.

* * * * *

UNITED STATES PATENT AND TRADEMARK OFFICE
CERTIFICATE OF CORRECTION

PATENT NO. : 8,458,595 B1  
APPLICATION NO. : 13/090968  
DATED : June 4, 2013  
INVENTOR(S) : Vlad Margulis Page 1 of 1

It is certified that error appears in the above-identified patent and that said Letters Patent is hereby corrected as shown below:

Title Page:

ABSTRACT, Line 6, delete "a" and insert -- an -- after "...input to select", therefor.

Signed and Sealed this
Seventeenth Day of September, 2013

Teresa Stanek Rea
*Deputy Director of the United States Patent and Trademark Office*